UNITED STATES PATENT OFFICE.

GEORGE THOMPSON, OF EAST TARENTUM, PENNSYLVANIA.

IMPROVEMENT IN DEVICES FOR PUTTING UP CAUSTIC ALKALIES.

Specification forming part of Letters Patent No. 15,957, dated October 21, 1856; Reissue No. 654, dated February 1, 1859.

*To all whom it may concern:*

Be it known that I, GEORGE THOMPSON, of East Tarentum, in the county of Allegheny and State of Pennsylvania, have invented a new and useful Mode of Putting Up Caustic Alkalies; and I do hereby declare that the following is a full, clear, and exact description thereof.

My invention consists in putting up the hydrated alkalies of soda and potassa in small quantities (say ten pounds or less) in small air-tight wrappings, cases, or boxes, of such convenient size that when opened the contents may be used at once for the purposes required, thus forming a new article of commerce and manufacture by introducing into general use for domestic and other purposes, in small quantities, those concentrated alkalies which, owing to their peculiar chemical properties, have not, prior to my invention, been susceptible of such use in small quantities. The hydrated alkalies of soda and potassa, commonly known as "caustic soda" and "potash," are highly-concentrated alkalies, which are well known in commerce and extensively used in large quantities in sundry manufactures. These articles would prove very useful for domestic and other purposes in small quantities; but owing to the fact that they speedily deliquesce after being exposed even for a short time to the action of atmospheric air, and that by their caustic property they attack and destroy almost everything with which they are allowed to come in contact in their deliquescent state, their use for domestic and other purposes where a small quantity only at a time is requisite has been, prior to my invention, almost impossible, inasmuch as it is necessary to keep these articles in air-tight packages, and, if once opened so as to admit the air, the contents of these packages must be at once made use of, or they will at once deliquesce and become useless. These caustic alkalies are ordinarily, when manufactured, put up in large quantities, of about four hundred and fifty pounds each, in air-tight barrels, and in this shape they are for the reasons above stated totally unsuited for domestic purposes or use in small quantities, because the opening of an original package to take out a small portion of its contents would result in damage to the whole of the remainder. Now, if caustic soda and potash can be made in small cakes or lumps of uniform size and with smooth exterior, so as to admit of their being so closely enveloped in air-tight wrappings or coverings as to exclude any atmospheric air or moisture from the interior, or poured in a molten state into small air-tight boxes, canisters, or other receptacles which will withstand the heat of the melted alkali, then these valuable articles can be sold and kept on hand for use in small quantities, as occasion may require, and thus become accessible to the public.

After various experiments more or less successful, I invented a mode of dividing the caustic soda, when in a state of fusion, into small cakes of uniform weight and size and smooth exterior surface, (for which invention Letters Patent of the United States were granted to me on the 24th day of July, A. D. 1855,) and I have also discovered a method of incasing these cakes, while yet so hot as not to be injuriously affected by the atmosphere, in a suitable covering, impervious alike to air and moisture. I employ, as a wrapping, muslin, paper, or other suitable material, which I dip into a melted preparation of beeswax and rosin, or melted tar and rosin, or other similar substances, which renders the wrapping impervious to air or moisture. The cakes of caustic soda or potash, so soon as they are sufficiently solid to bear handling, are immediately folded up carefully in the wrapping thus prepared, the sticky nature of the substance with which the wrapping is impregnated causing it to adhere together where the edges fold over each other, and thus serving to exclude entirely the air and moisture from obtaining access to the case of caustic alkali within. The package thus wrapped may then, for further protection, be immersed in the melted preparation used for preparing the wrapping fabric, which gives it a uniform coating all over and covers up any opening which may exist in the folds of the wrapping. When thus wrapped and prepared, an exterior covering of common paper is added for cleanliness and convenience of handling and packing, and the packages are then ready for sale, and may be kept without injury to the alkali for almost any length of time. When used for making soap, the inner covering of prepared paper need not be removed, as the small quantity of rosin and beeswax will not injuriously affect the soap. It may be readily removed, however, if preferred. Another method which I have invented of accomplishing the same result is to provide small boxes or canisters of thin sheet-iron or other metal, united at the joints with any suitable cement infusible at the degree of heat to which it will be exposed from the caustic soda or other caustic alkali. Into these boxes I pour the caustic alkali, in a molten state, until they are quite full. The lid of the box is then pressed down so close to the surface of the melted contents of the box as to exclude all air or moisture, and is secured by cement. The heat of the contents of the box hardens the cement, and the whole box may then be dipped in varnish as an additional security against the entrance of the air. This plan differs in detail from that first described; but the principal is the same, both being designed to enable the manufacturer of these caustic alkalies to put them up in original packages of uniform size and weight, and each containing so small a quantity that when a package or box is opened its whole contents may conveniently be used at once.

What I claim as my invention, and desire to secure by Letters Patent, is—

The putting up of the caustic alkalies of soda and potassa in small quantities in air-tight wrappings, cases, or boxes, in the manner hereinbefore described, or its equivalent, for the purposes of introducing into general use for domestic and other purposes those articles, which, owing to their peculiar chemical properties, have not heretofore been susceptible of general use in small quantities.

GEORGE THOMPSON.

Witnesses:

MARTIN G. CUSHING,

W. BAKEWELL.